United States Patent
Sanabria et al.

(10) Patent No.: US 9,710,773 B2
(45) Date of Patent: *Jul. 18, 2017

(54) MODELING USER INPUT AND INTERACTION IN WORKFLOW BASED APPLICATIONS

(71) Applicant: Microsoft Technology Licensing, LLC, Redmond, WA (US)

(72) Inventors: Andres Sanabria, Sammamish, WA (US); Constantin Mihai, Bellevue, WA (US); Nikhil Kothari, Sammamish, WA (US); Israel Hilerio, Kenmore, WA (US); Michael Harder, Bellevue, WA (US); Paul E. Maybee, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

This patent is subject to a terminal disclaimer.

(21) Appl. No.: 14/497,799

(22) Filed: Sep. 26, 2014

(65) Prior Publication Data

US 2015/0206079 A1  Jul. 23, 2015

Related U.S. Application Data

(63) Continuation of application No. 11/321,490, filed on Dec. 29, 2005, now Pat. No. 8,849,691.

(51) Int. Cl.
*G06Q 10/00* (2012.01)
*G06Q 10/06* (2012.01)

(52) U.S. Cl.
CPC ......... *G06Q 10/0633* (2013.01); *G06Q 10/06* (2013.01); *G06Q 10/06316* (2013.01)

(58) Field of Classification Search
None
See application file for complete search history.

(56) References Cited

U.S. PATENT DOCUMENTS

| 5,490,097 A | 2/1996 | Senson |
| 5,748,962 A | 5/1998 | Brechtel |
| 5,918,226 A | 6/1999 | Tarumi |

(Continued)

FOREIGN PATENT DOCUMENTS

| GB | 2396928 | 7/2004 |
| JP | 2003-331095 | 11/2003 |

(Continued)

OTHER PUBLICATIONS

Notice of Allowance dated Feb. 3, 2016 cited in U.S. Appl. No. 12/345,288.

(Continued)

*Primary Examiner* — Johnna Loftis
(74) *Attorney, Agent, or Firm* — Workman Nydegger

(57) ABSTRACT

Systems and methods that implement interactivity as part of a workflow itself. Data is passed in and out of the workflow to form an interactive workflow, via employing an interactive activity component. Such interactive activity component models suspension points within a workflow definition, wherein user input and associated interaction can be supplied to the workflow during various interactivity breaks that request user input. Such an arrangement enables a controlled/synchronous data exchange between the workflow and a host application associated therewith.

20 Claims, 9 Drawing Sheets

(56) References Cited

U.S. PATENT DOCUMENTS

| | | |
|---|---|---|
| 5,960,404 A | 9/1999 | Chaar |
| 5,999,910 A | 12/1999 | Rosenfeld |
| 5,999,911 A | 12/1999 | Berg |
| 6,041,306 A | 3/2000 | Du et al. |
| 6,047,260 A | 4/2000 | Levinson |
| 6,065,009 A | 5/2000 | Leymann |
| 6,108,711 A | 8/2000 | Beck |
| 6,115,640 A | 9/2000 | Tarumi |
| 6,134,559 A | 10/2000 | Brumme |
| 6,151,583 A | 11/2000 | Ohmura |
| 6,253,369 B1 | 6/2001 | Cloud |
| 6,272,672 B1 | 8/2001 | Conway |
| 6,282,531 B1 | 8/2001 | Haughton |
| 6,308,224 B1 | 10/2001 | Leymann |
| 6,339,838 B1 | 1/2002 | Weinman |
| 6,397,191 B1 | 5/2002 | Notani |
| 6,434,568 B1 | 8/2002 | Bowman-Amuah |
| 6,442,528 B1 | 8/2002 | Notani |
| 6,473,794 B1 | 10/2002 | Guheen |
| 6,499,023 B1 | 12/2002 | Dong |
| 6,539,396 B1 | 3/2003 | Bowman-Amuah |
| 6,578,006 B1 | 6/2003 | Saito |
| 6,675,133 B2 | 1/2004 | Knowles |
| 6,697,784 B2 | 2/2004 | Bacon |
| 6,769,113 B1 | 7/2004 | Bloom |
| 6,772,216 B1 | 8/2004 | Ankireddipally |
| 6,772,407 B1 | 8/2004 | Leymann |
| 6,801,227 B2 | 10/2004 | Bocionek |
| 6,820,118 B1 | 11/2004 | Leymann |
| 6,826,579 B1 | 11/2004 | Leymann |
| 6,839,062 B2 | 1/2005 | Aronson |
| 6,847,974 B2 | 1/2005 | Wachtel |
| 6,854,016 B1 | 2/2005 | Kraenzel |
| 6,877,153 B2 | 4/2005 | Konnersman |
| 6,941,514 B2 | 9/2005 | Bradford |
| 6,968,503 B1 | 11/2005 | Chang |
| 6,983,421 B1 | 1/2006 | Lahti |
| 7,069,536 B2 | 6/2006 | Yaung et al. |
| 7,120,800 B2 | 10/2006 | Ginter |
| 7,240,070 B1 | 7/2007 | Cheng |
| 7,370,335 B1 | 5/2008 | White et al. |
| 7,464,366 B2 | 12/2008 | Shukla et al. |
| 7,698,383 B2 | 4/2010 | Goring |
| 7,827,127 B2 | 11/2010 | Wolf et al. |
| 7,881,233 B2 | 2/2011 | Bieselin |
| 8,862,507 B2 | 10/2014 | Sandhu et al. |
| 2002/0016810 A1 | 2/2002 | Watanabe |
| 2002/0030703 A1 | 3/2002 | Robertson |
| 2002/0032775 A1 | 3/2002 | Venkataramaiah |
| 2002/0038450 A1 | 3/2002 | Kloppmann et al. |
| 2002/0065701 A1 | 5/2002 | Kim |
| 2002/0147611 A1 | 10/2002 | Greene |
| 2002/0161615 A1 | 10/2002 | Yui |
| 2002/0188597 A1 | 12/2002 | Kern |
| 2003/0004770 A1 | 1/2003 | Miller |
| 2003/0004771 A1 | 1/2003 | Yaung |
| 2003/0018627 A1 | 1/2003 | Turner |
| 2003/0023622 A1 | 1/2003 | Obermeyer |
| 2003/0033191 A1 | 2/2003 | Davies et al. |
| 2003/0055668 A1 | 3/2003 | Saran et al. |
| 2003/0078975 A1 | 4/2003 | Ouchi |
| 2003/0090514 A1 | 5/2003 | Cole |
| 2003/0105654 A1 | 6/2003 | Macleod |
| 2003/0135384 A1 | 7/2003 | Nguyen et al. |
| 2003/0181991 A1 | 9/2003 | Chau |
| 2003/0217053 A1 | 11/2003 | Bachman |
| 2003/0233374 A1 | 12/2003 | Spinola et al. |
| 2004/0015841 A1 | 1/2004 | Lepjian |
| 2004/0046789 A1 | 3/2004 | Inanoria |
| 2004/0068728 A1 | 4/2004 | Blevins |
| 2004/0078105 A1 | 4/2004 | Moon |
| 2004/0103014 A1 | 5/2004 | Teegan |
| 2004/0111430 A1 | 6/2004 | Hertling et al. |
| 2004/0117795 A1 | 6/2004 | Wang |
| 2004/0122853 A1 | 6/2004 | Moore |
| 2004/0138939 A1 | 7/2004 | Theiler |
| 2004/0162741 A1 | 8/2004 | Flaxer et al. |
| 2004/0199614 A1 | 10/2004 | Shenfield |
| 2004/0201604 A1 | 10/2004 | Kraenzel |
| 2004/0268338 A1 | 12/2004 | Gurpinar |
| 2005/0005259 A1 | 1/2005 | Avery |
| 2005/0015711 A1 | 1/2005 | Yamamoto |
| 2005/0044173 A1 | 2/2005 | Olander |
| 2005/0066287 A1 | 3/2005 | Tattrie |
| 2005/0096959 A1 | 5/2005 | Kumar et al. |
| 2005/0149908 A1 | 7/2005 | Kilanev |
| 2005/0203757 A1 | 9/2005 | Lei |
| 2005/0234902 A1 | 10/2005 | Meredith |
| 2006/0195347 A1 | 8/2006 | Bultmeyer et al. |
| 2006/0229924 A1 | 10/2006 | Aron et al. |
| 2006/0235964 A1 | 10/2006 | Childress et al. |
| 2006/0294048 A1 | 12/2006 | Shukla et al. |
| 2007/0156485 A1 | 7/2007 | Sanabria |
| 2007/0156486 A1 | 7/2007 | Sanabria |
| 2007/0156487 A1 | 7/2007 | Sanabria |
| 2007/0156888 A1 | 7/2007 | Hilerio |
| 2007/0233969 A1 | 10/2007 | Shukla et al. |
| 2007/0234129 A1 | 10/2007 | Shukla et al. |
| 2007/0239498 A1 | 10/2007 | Shukla et al. |
| 2007/0239499 A1 | 10/2007 | Shukla et al. |
| 2007/0239505 A1 | 10/2007 | Shukla et al. |
| 2007/0245300 A1 | 10/2007 | Chan et al. |
| 2008/0040417 A1 | 2/2008 | Juncker |
| 2008/0114628 A1 | 5/2008 | Johnson |
| 2008/0127156 A1 | 5/2008 | Buza et al. |
| 2008/0167925 A1 | 7/2008 | Mehta et al. |
| 2008/0243524 A1 | 10/2008 | Agrawal et al. |
| 2010/0036859 A1 | 2/2010 | Pinto et al. |
| 2010/0070422 A1 | 3/2010 | Kikuchi et al. |
| 2010/0169862 A1 | 7/2010 | Wolf |
| 2010/0306778 A1 | 12/2010 | Wolf et al. |
| 2010/0324948 A1 | 12/2010 | Kumar |
| 2013/0125136 A1 | 5/2013 | Kalra |
| 2016/0274869 A1 | 9/2016 | Wolf |

FOREIGN PATENT DOCUMENTS

| | | |
|---|---|---|
| JP | 2005-506618 | 3/2005 |
| JP | 2005-63253 | 7/2005 |
| KR | 1020010063810 | 7/2001 |
| WO | WO 02-21314 | 3/2002 |
| WO | 2004-059938 | 7/2004 |
| WO | WO 2004-055633 | 7/2004 |
| WO | 2004-077262 | 9/2004 |

OTHER PUBLICATIONS

Office Action dated Jun. 1, 2015 cited in U.S. Appl. No. 13/296,014.

Muth, et al., "From Centralized Workflow Specification to Distributed Workflow Execution" Journal of intelligent Information Systems, Mar. 1998, vol. 10, No. 2, pp. 159-184, Abstract, 2 pages.

Kappel, et al., "A Framework for Workflow Management Systems Based on Objects, Rules and Roles", 2000, 5 pages.

Moldt, et al., "Pattern Based Workflow Design Using Reference Nets", Lecture Notes in Computer Science, Business Process Management: International Conference, BPM 2003, Jun. 26-27, 2003, pp. 246-260, Abstract, 2 pages.

D. Manolescu, "An Extensible Workflow Architecture with Objects and Patterns", Chapter 4 in Technology of Object-Oriented Languages, Systems, and Architectures, Theo D'Hondt, editor., 2003, 12 pages, Kluwer Academic Publishers.

Leymann, et al., "Workflow-based applications", IBM Systems Journal, 1997, vol. 36, No. I, pp. 102-123.

Huang, et al., "Unified enterprise modeling and integration environment based on Workflow technology", Proceedings of the Third International Conference (ICeCE2003), Oct. 2003, pp. 1000-1003.

Lond, et al., "Accommodating Change in Enterprise Applications", Thesis, IT-University of Copenhagen, 2002, 110 pages.

Vossen, et al., "The WASA2 Object-Oriented Workflow Management System", SIGMOD '99, Philadelphia PA, 1999, pp. 587-589.

(56) References Cited

OTHER PUBLICATIONS

Manolescu, et al., "Dynamic Object Model and Adaptive Workflow", OOPSLA Workshop on Metadata and Active Object Models, 1999, 19 pages.
Chen, et al., "Multi-Agent Cooperation, Dynamic Workflow and XML for E-Commerce Automation", HP Labs Technical Report, HPL-1999-136, Oct. 1999, 10 pages, Software Technology Laboratory, Palo Alto, CA.
Ader, et al., "WooRKS, an Object Oriented Workflow System for Offices" IEEE Bulletin of the Technical Committee on Data Engineering, Mar. 1995,81 pages, vol. 18,No. 1.
Kim, et al., "WW-FLOW: Web based workflow management with runtime encapsulation" IEEE Internet Computing, May-Jun. 2000, pp. 55-64, vol. 4, No. 3.
Miller, et al., "WebWork: METEOR2's Web-based Workflow Management System", Journal of intelligent Information Systems, Special Issue Workflow Management Systems, Mar.-Apr. 1998, pp. 185-215, vol. 10, No. 2.
Windows Workflow Foundation accessible at: http://msdn.microsoft.com|windowsvistalbuilding!workflow/defaull.aspx, last accessed: Nov. 16, 2005, 4 pages.
International Search Report mailed Jun. 8, 2007, for PCT Application Serial No. PCT/US2006/047220, 8 Pages.
Improving Correctness and Failure Handling in Workflow Management Systems, Kamath, Mohan Umesh, Ph.D., University of Massachussetts Amherst, 1998, 209 Pages; AAT 9841883.
G. Wirtz; M. Weske; H.Giese; The OCoN Approach to Workflow Modeling in Object-Oriented Systems, Information Systems Frontiers, Sep. 2001; 3, 3; ABI/INFORM Global, p. 357-376.
The Workflow Management Coalition—The Workflow Reference Model, Document TC00-1003, Hollingsworth, David, Jan. 19, 1995, pp. 1-55.
Angus, Jeff, "Jet Form's University Deployable Workflow", 1998, Information Week, Iss. 679, p. 104, Pro Quest ID 29161881.
M2 Press Wire, "Team WARE: Team WARE Flow 2.0 Chosen as Product of Choice for Collaboration & Ad-hoc Workflow Apps", Jan. 1998, Coventry, p. 1, ProQuest ID 25682717.
"Conceptual Design and Implementation of a Graphical Workflow-Modelling Editor in the Context of Distributed Groupware-Databases", by Marcus Ott, University of Paderborn Faculty of Business Studies, Germany, May 1994.
"An Evaluation of Methodological Issues in Workflow Management", by Anastasia Sotnikova, Department of Computer Engineering and Information Science and the Institute of Engineering and Science of Bilkent University, Aug. 1998.
"Specification and Implementation of Exceptions in Workflow Management System", by Fabio Casati et al., ACM Transactions on Database System, vol. 24, No. 3, Sep. 1999, pp. 405-451.
"RainMan: A Workflow System for the Internet", IMB T.J. Watson Research Center, Yorktown Heights, NY 1997.
"Window Workflow Foundation Runtime Services: The Persistence Service", http://web.archive.org/web/20051212062613/http://weblogs.asp.net/gsusx/archive/2005/10/05/426699.aspx.
"Action Workflow Enterprise Series 3.0 Process Builder User's Guide", Action Technologies, Inc., 1996.
Dragos A. Manolescu, Workflow enactment with continuation and future objects, In Proceedings of the ACM Conference on Object-Oriented Programming, Systems, Languages, and Applications (OOPSLA), pp. 40-51, Seattle, Washington, USA, 2002.
Paul Andrew et al: "Presenting Windows Workflow Foundation, Beta Edition", Sep. 12, 2005, Sams.
Nick Russel et al: "Workflow Data Patterns", Queensland university of Technology Technical Reports, Apr. 2004, pp. 1-75 http://www.workflowpatterns.com/documentation/documents/data_patterns%20BETA%20TR.pdf.
Matthias Kloppmann et al: "WS-BPEL Extension for People", Jul. 2005, pp. 1-18 http://www.sdn.sap.com/irj/scn/go/portal/prtroot/docs/library/uuid/cfab6fdd-0501-0010-bc82-f5c2414080ed?QuickLink=index&overridelayout=true.
Garcia, Josefina Guerrero, et al., "FlowiXML: A Step Towards Designing Workflow Management Systems", Int J. Web Engineering and Technology, vol. 4, No. 2, 2008, pp. 163-182.
Microsoft, "Streamlined, Customized Workflow Demonstrates Power and Flexibility of Development Platform", Oct. 2007, 12 pages.
Bihler, Pascal, et al., "Supporting Cross-Application Contexts with Dynamic User Interface Fusion", Prodeedings of the MoBe Workshop at Informatik 2007, 6 pages.
Hemel, Z., et al., "WebWorkFlow: An Object-Oriented Workflow Modeling Language for Web Applications", 2008, 19 pages.
"Persistent Data Storage with CORBA", by Chris Mayers, ANSA, Poseidon House Castle Park, Cambridge CB3 0rd, UK, Apr. 1996.
"Flexible Persistence Framework for Object-Oriented Middleware", by Mathias Weske and Dominik Kuropka, Hasso Plattner Institute for Software Systems Engineering, Am Luftschiffhafen 1, 14471 Potsdam, Germany. Jun. 25, 2001.
"Openwings Data Services Specification Beta Ver 0.81", General Dynamics Decision Systems, Inc., May 16, 2002.
"A Cooperative Workflow Management System with the Meta-Object Facility", by Le Pallec Xavier and Vantroys Thomas, Laboratoire Trigone—Equipe Noce, Cite Scientifique 59655 Villeneuve D'Ascq Cedex, France, IEEE, 2001.
Ellis, Keddara, Rozenberg; Dynamic Change within Workflow Systems; 1995; ISBN:0-89791-706-5.
Masakazu Sasaki, "Java Development Environment of GUI base to achieves from application development to system integration on BEA WebLogic Platform 8.1J, Try using BEA WebLogic Platform 8.1J", DB Magazine, vol. 13, No. 8, pp. 2-9, Nov. 1, 2003, Shoeisha Co., Ltd., Japan.
Yoshihisa Nakatani, "Java Development Environment of GUI base to Acehives from Application development to system integration on BEA WebLogic Platform 8.1J, Try Using BEA WebLogic Platform 8.1J", DB Magazine, vol. 13, No. 8, pp. 23-28, Nov. 1, 2003, SHOEISHA Co., Ltd., Japan.
"Useful! Method for Using an Application Server, Higuchi Laboratory, 15th Installment," Notes/Domino Magazine, vol. 5, No. 8, pp. 136-141, Softbank Publishing Inc., Japan, Aug. 1, 2000.
"New Age of Application Servers, 21st Century for 'Software Industry' Wherein EJB Components Are Commonly Used," Computopia, vol. 35, No. 410, pp. 24-25, Computer Age Co. Ltd., Japan, Nov. 1, 2000.
"Making a J2EE Application a Transparent Service, Scott Dietzen, CTO of BEA, Told its Entire Web Service, BEA WebLogic Server 6.1 & WebLogic Integration," Computopia, vol. 36, No. 420, pp. 84-89, Computer Age Co. Ltd., Japan, Sep. 1, 2001.
Eberle, et al., "Implementatin Architectures for Adaptive Workflow Management", In Proceedings of the Second International Conference on Adaptive and Self-Adaptive systems and Applications, 2010, pp. 98-103.
Akram, et al., "Application of Business Process Execution Language to Scientific Workflows", In Proceedings of International Transactions on Systems and Applications, 2006, 14 pages.
"Oracle Workflow", In Proceedings of Oracle Developer's Guide, Sep. 2003, 662.
"Softwaremaker", Retrieved on: Oct. 27, 2011, Available at: http://www.softwaremaker.net/blog/CategoryView,category,Windows%2BCommunication%2BFoundation%2B(WCF)%2Baka%2BIndigo.aspx.
"SAP EDI Work Flow Set up Part Three", Retrieved on: Oct. 28, 2011, Available at: http://www.abapprogramming.net/2009_03_01_archive.html.
Zdancewic et al., "A Language-based Approach to Unifying Events and Threads", http://www.cis.upenn.edu/~stevez/papers/LZ06b.pdf, Apr. 29, 2006, 15 pages.
Pickett et al., "Libspmt: A Library for Speculatie Multithreading", http://www.sable.mcgill.ca/publications/techreports/2007-1/pickett-07-libspmt-TR.pdf, Mar. 12, 2007, 22 pages.
Savinov, "Concept as a Generalization of Class and Principles of the Concept-Oriented Programming", http://conceptoriented.com/savinov/publicat/csjm_05.pdf, 2005, 43 pages.

(56) References Cited

OTHER PUBLICATIONS

Bhoedjang, "Communication Architectures for Parallel-Programming Systems", http://dare.ubvu.vu.nl/bitstream/1871/11711/5242.pdf, 2000, 282 pages.
Bukovics, "Pro WF Windows Workflow in .NET 3.5", Jun. 26, 2008, Apress, ISBN 978-1-4302-0975; Chapters 1-19, 852 pages.
Russell, et al., "Workflow Data Patterns", In Queensland University of Technology Technical Reports, Apr. 2004, pp. 1-75.
"First Office Action Issued in India Patent Application No. 2201/CHENP/2008", Mailed Date: Feb. 6, 2015, 2 Pages.
U.S. Appl. No. 11/321,820, Oct. 14, 2009, Office Action.
U.S. Appl. No. 11/321,777, Dec. 9, 2008, Office Action.
U.S. Appl. No. 11/321,777, Jul. 9, 2009, Office Action.
U.S. Appl. No. 11/321,777, Dec. 11, 2009, Notice of Allowance.
U.S. Appl. No. 11/321,789, Feb. 26, 2010, Office Action.
U.S. Appl. No. 11/321,820, Mar. 15, 2010, Office Action.
U.S. Appl. No. 11/321,789, Jul. 21, 2010, Office Action.
U.S. Appl. No. 11/321,820, Jul. 20, 2010, Office Action.
U.S. Appl. No. 11/321,820, Nov. 23, 2010, Office Action.
U.S. Appl. No. 12/487,212, Sep. 26, 2011, Office Action.
U.S. Appl. No. 11/321,789, Dec. 12, 2011, Office Action.
U.S. Appl. No. 11/321,820, Apr. 30, 2012, Office Action.
U.S. Appl. No. 12/487,212, May 2, 2012, Office Action.
U.S. Appl. No. 13/296,014, May 1, 2013, Office Action.
U.S. Appl. No. 12/345,288, Jun. 7, 2012, Office Action.
U.S. Appl. No. 12/345,288, Oct. 11, 2012, Notice of Allowance.
U.S. Appl. No. 13/296,014, Oct. 25, 2013, Office Action.
U.S. Appl. No. 12/345,288, Jan. 3, 2014, Office Action.
U.S. Appl. No. 12/487,212, Mar. 21, 2014, Office Action.
U.S. Appl. No. 12/345,288, Sep. 10, 2014, Office Action.
U.S. Appl. No. 12/487,212, Oct. 15, 2014, Office Action.
U.S. Appl. No. 13/296,014, Nov. 25, 2014, Office Action.
U.S. Appl. No. 11/321,490, Sep. 22, 2008, Office Action.
U.S. Appl. No. 11/321,490, May 22, 2009, Office Action.
U.S. Appl. No. 11/321,490, Sep. 17, 2009, Office Action.
U.S. Appl. No. 11/321,490, Mar. 19, 2010, Office Action.
U.S. Appl. No. 11/321,789, Jun. 21, 2011, Office Action.
U.S. Appl. No. 11/321,490, Sep. 21, 2012, Office Action.
U.S. Appl. No. 11/321,490, Mar. 1, 2013, Office Action.
U.S. Appl. No. 11/321,490, Nov. 29, 2013, Office Action.
U.S. Appl. No. 11/321,490, May 21, 2014, Notice of Allowance.
Oracle, "Analytic Calculation Engine Metadata Classes", Mar. 2007, pp. 1-70.
Office Action dated Aug. 5, 2015 cited in U.S. Appl. No. 12/345,288.
Notice of Allowance dated Sep. 25, 2015 cited in U.S. Appl. No. 13/296,014.

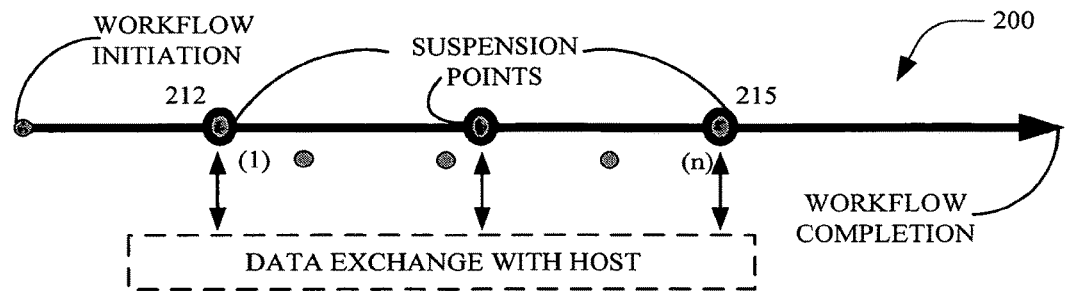
Fig. 2
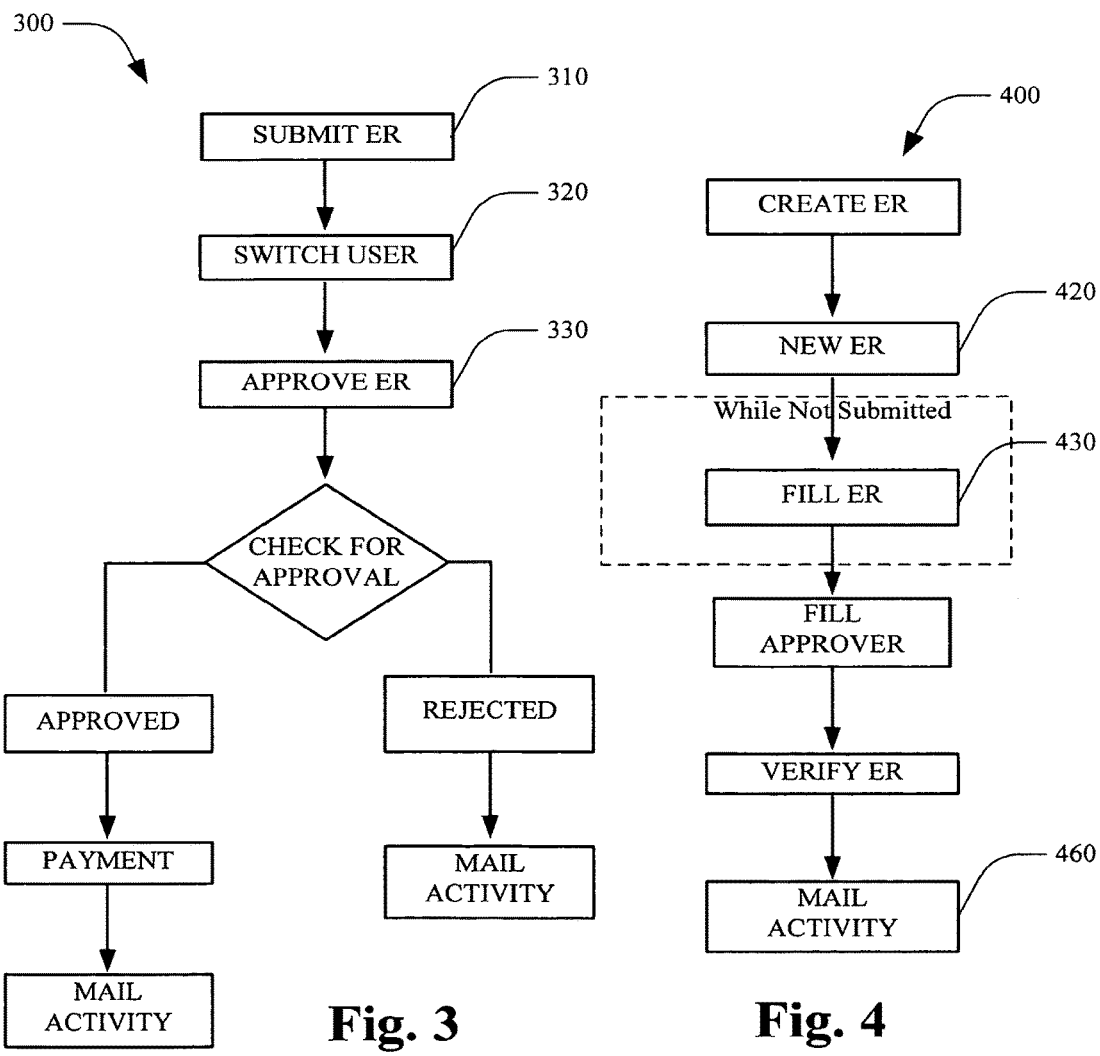
Fig. 3  Fig. 4

MODELING USER INPUT AND INTERACTION IN WORKFLOW BASED APPLICATIONS

CROSS-REFERENCE TO RELATED APPLICATIONS

This application is a continuation of U.S. patent application Ser. No. 11/321,490, filed Dec. 29, 2005 and titled "MODELING USER INPUT AND INTERACTION WORKFLOW BASED APPLICATIONS," and which issued as U.S. Pat. No. 8,849,691 on Sep. 30, 2014. The entire content of the foregoing application is incorporated by reference herein in its entirety.

BACKGROUND

Workflow generally is the flow of information and control in such organizations. Businesses continually strive to define, document, and streamline such processes in order to effectively compete. In a business setting, these processes include sales and order processing, purchasing tasks, inventory control and management, manufacturing and production control, shipping and receiving, accounts payable, and the like.

Computer systems and associated software now provide tools with which businesses and other organizations can improve their workflow. Software tools can be used to model business workflow processes or schedules and identify inefficiencies and possible improvements. In addition, where a process involves exchanging data between people, departments, plants, or even between separate companies, computer systems and networks can be used to implement these exchanges. Such systems and software tools are further able to implement large-scale computations and other data or information processing that are typically associated with business related information.

Accordingly, workflow management includes the effective management of information flow and control in an organization's business processes, wherein automation of such information processing has led to many efficiency improvements in the modern business world. Moreover, such automation of workflow management is now allowing businesses and other organizations to further improve performance by executing workflow transactions in computer systems, including global computer networks, such as the Internet.

A typical workflow-based application often requires a plurality of conditions to be satisfied. For example, one such condition is the ability to make decisions based on business rules. This can include simple rules, (e.g., like as a yes-or-no decision based on the result of a credit check), and more complex rules, (e.g., the potentially large set that must be evaluated to make an initial underwriting decision.) Another requirement is communication with other software and other systems outside the workflow. For example, an initial request can be received from one part of the application, while some aspects, (e.g., contacting a credit service) can require communication using other web services or technologies. A further condition to be satisfied is the proper interaction of the workflow with users. For example, the workflow should typically be able to display a user interface itself or interact with human beings through other software. Moreover, the ability to maintain state throughout the workflow's lifetime is another condition that needs to be satisfied. Accordingly, creating and executing a workflow in software poses unique challenges.

For example, some business processes can take hours, days, or weeks to complete, and maintaining information about the workflow's current state for such length of time is demanding. Moreover, such kind of long-running workflow will also typically communicate with other software in a non-blocking way, and an asynchronous communication can pose difficulties. At the same time, while modeling fixed interactions among software is relatively straightforward, consumers tend to continuously require additional flexibility, such as the ability to change a business process on-the-fly. Handling diverse applications can further add to the complexities involved in workflow creation and management.

Many applications for workflow tools are internal to a business or organization. With the advent of networked computers having modems or other type communications links, computer systems at remote locations can now communicate easily with one another. Such enhanced communication allows computer system workflow applications to be used between remote facilities within a company. An example would include forwarding a customer order from a corporate headquarters to a remote field sales office for verification by the appropriate sales person, and returning a verification to the headquarters. Workflow applications also can be of particular utility in processing business transactions between different companies. In a typical application, two companies having a buyer-seller relationship may desire to automate the generation and processing of purchase orders, product shipments, billing, and collections.

For example, an application targeting a specific problem, such as customer relationship management (CRM), or a specific vertical market, such as financial services, can be built around a workflow. Such kind of application commonly implements a number of different business processes. Building the logic that drives those processes on a common workflow foundation such as Windows Workflow Foundation can make the application faster to build, quicker to change, and easier to customize. Moreover automating such processes can result in significant efficiency improvements, which are not otherwise possible. However, such inter-company application of workflow technology requires cooperation of the companies and proper interfacing and proper persistence service implementation of the individual company's existing computer systems and applications.

Thus far, workflow application tools have been developed that provide some capability for automating business workflow by defining workflow schedules. For example, a buyer may wish to transmit a purchase order number along with a list of products being purchased to a seller, and the seller may wish to respond with a confirmation of the order and an expected shipment date. Such type of transaction can involve a general consumer purchasing products from a retailer, or alternatively two large corporate entities that transact business regularly. The data associated with the order and the confirmation may be relatively small and the transmission time for the data may be on the order of fractions of a second. A workflow schedule application running in a computer system may allocate system resources to the transaction during its pendency, which is generally very short.

However, modeling a user interaction within a workflow poses difficulties. In particular, when people are involved, a workflow can take a long time to complete, and building scalable systems requires a deactivation of the workflow for interaction with a user. Moreover, driving a user interface (UI) based on workflow state, regardless of the kind of application can further increase the complexities involved.

Therefore, there is a need to overcome the aforementioned exemplary deficiencies associated with conventional systems and devices.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation provides for systems and methods that implement interactivity/user input as part of a workflow itself wherein data is passed in and out of the workflow to form an interactive workflow, via employing an interactive activity component. Such interactive activity component models suspension points within a workflow definition, and is agnostic to an application type to encompass web service applications, console, desktop, web services and the like. Accordingly, user input and associated interaction can be supplied to the workflow during various interactivity breaks that request user input, to enable a controlled/synchronous data exchange between the workflow and a host application that is associated with the workflow. Thus, at defined times within an execution of the workflow, user context can be associated with a workflow instance.

In a related aspect, the interactive activity component and the suspension points can pertain to switching users of the workflow. For example, the workflow can drive the User Interface (UI) based on the state of the workflow during suspension, such as information relating to the user of the workflow. Accordingly, an interactive workflow is supplied, which executes up to particular points, and provides feed back to the hosting application. Moreover, the hosting application can change an appearance of the workflow based on the suspension state. A workflow type can be defined (e.g., programmatically or via a visual tool), and the host application can subscribe to suspending events to supply a hook into the execution of the workflow. The suspending event(s) can then be raised and based on the information in such event (e.g., information regarding a current user of the workflow), the UI appearance can change. Thus, data can be passed in and out of a workflow class, and custom features can be defined for interaction during run time (e.g., strongly typed workflow).

For example in a context of an expense report, an initial user can initiate an expense report workflow, and an approver user can then approve such expense report. Thus, a process can be abstracted into the workflow class, wherein the process and workflow class is being run up to a point where an approver should be involved. At such point the interaction of the initial user is stopped. The approver can then launch the application (e.g., from a different machine) to run the workflow and resume the workflow instance with the action specified by the approver (e.g., approve, disapprove, and the like). Thus, data can be passed in and out of the workflow instance at suspension points during lifetime of the workflow instance.

According to a methodology of the subject innovation, an act in the workflow can be checked to verify if it signifies an interactive activity. If so, the workflow is suspended. Subsequently, a suspension event is raised and communicated to the host. As such, and while the workflow instance is suspended data is obtained from the host and passed into and/or out of the workflow. Additionally, if data obtained from the host indicates a resume event, then the workflow can be resumed. The workflow can also be loaded based on a workflow instance identification (e.g., via a lookup component.) The resume event can be received by the workflow and executed, to reach the next act in the process.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

FIG. 2 illustrates a workflow execution with a plurality of suspension points that require interaction with a user and/or host.

FIGS. 3 & 4 illustrate a particular flow chart for an expense report with suspension points, according to an exemplary aspect of the subject innovation.

DETAILED DESCRIPTION

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system", "service" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term computer program as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 1:
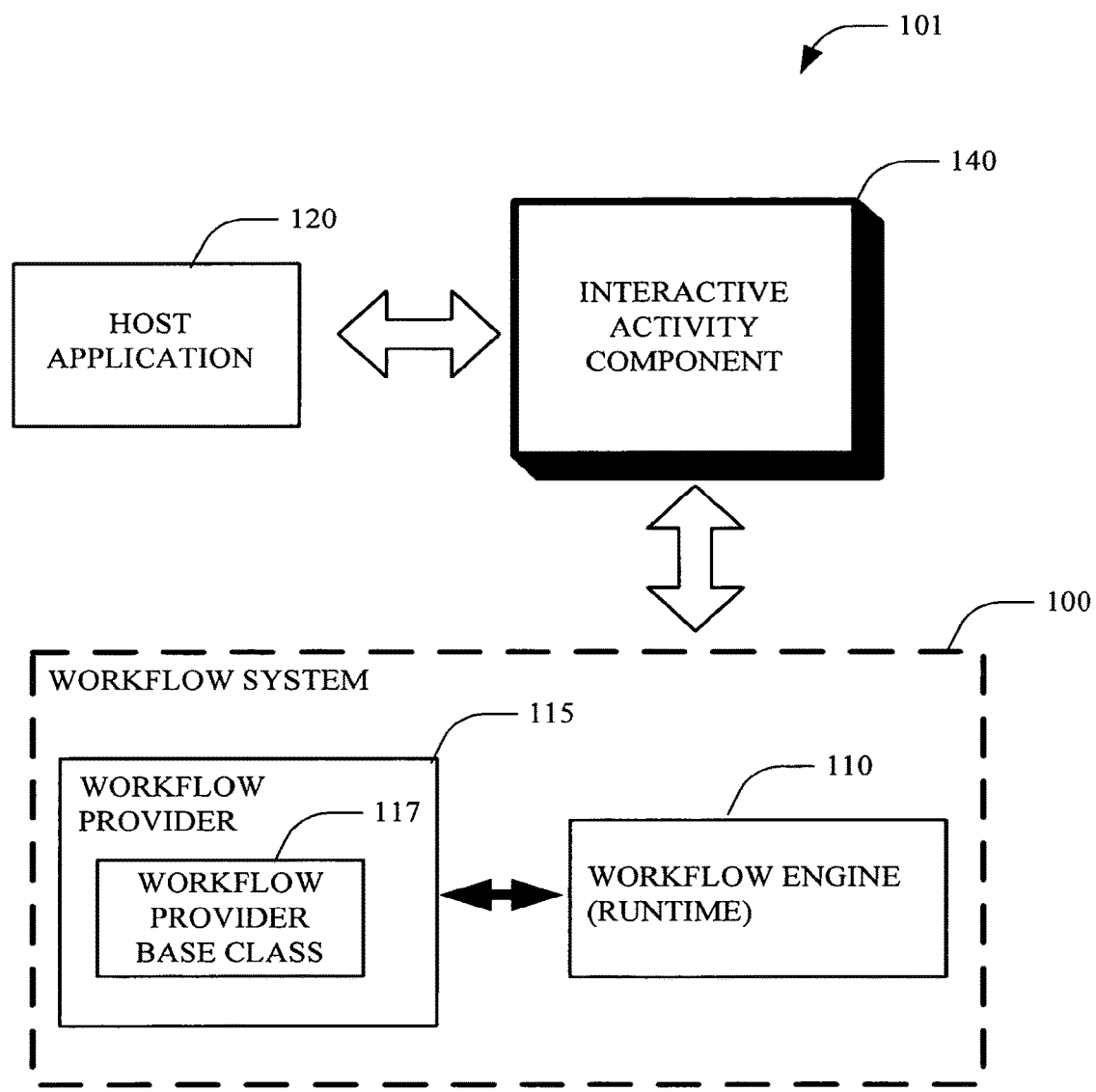
FIG. 1 illustrates an exemplary system diagram of a host application that interacts with a workflow via an interactive activity component.

Turning initially to FIG. 1, a block diagram for a system 101 is illustrated, which implements interactivity as part of the workflow itself, wherein data is passed in and out of the workflow to form an interactive workflow. The system 101 employs an interactive activity component 140 that models suspension points within a workflow definition, and is agnostic to an application type to encompass web service applications, console, desktop, web services and the like.

Moreover, the system 101 includes a host application 120 that interacts with a workflow system 100, wherein the workflow can model a human or system process that is defined as a map of activities. An activity is a step in a workflow, and is the unit of execution, re-use, and composition for a workflow. The map of activities expresses rules, actions, states, and their relation. Typically, the workflow runs via the workflow engine/runtime 110, and the workflow runtime requires an external application to host it, according to a few rules, as depicted by the host 120. Data exchange between the host 120 and the workflow system 100 can pertain to and/or describe the business documents and other objects that are employed for or that facilitate work flow activity or a flow between the local variables of the workflow that are used to communicated data with the host application 120.

For example, the host application 120 can interact with Workflow Provider 115 associated with the workflow system 100, through a Workflow Provider Base Class 117 and/or implementation associated therewith. In addition, the host 120 can be responsible for a number of additional and critical aspects, such as the creation of one or more workflows, marshaling of calls between various components as needed for proper execution of the workflow; and setup of isolation mechanisms. Moreover, the host 120 can create multiple processes to take advantage of multiple Central Processing Units (CPUs) in a machine for scalability reasons, or to run a large number of workflow instances on a farm of machines. The host 120 can further control the policies to apply when a workflow is subject to a long wait, listen for specific events and communicate them to a user or administrator, set timeouts and retries for each workflow, expose performance counters, and write log information for debugging and diagnostic purposes.

A workflow associated with the workflow system 101 can communicate with the outside world through a service established specifically for that purpose, wherein such service can raise events that event-driven activities inside the workflow will hook up. Likewise, the service exposes public methods for the workflow to call and send data to the host.

As illustrated in FIG. 1, the interactive activity component 140 can implement interactivity as part of a workflow itself wherein data is passed in and out of the workflow, to form an interactive workflow. The interactive activity component 140 models suspension points within a workflow definition. Accordingly, user input and associated interaction can be supplied to the workflow during various interactivity breaks that request user input, to enable a controlled/synchronous data exchange between the workflow and a host application that is associated with the workflow. Thus, at defined times within an execution of the workflow, user context can be associated with a workflow instance.

FIG. 2 illustrates a workflow 200 execution with a plurality of suspension points that require interaction with a user. The suspension points 212-215 (1 to n, where n is an integer) can be modeled by the interactive activity component to correspond to instances during a workflow run time, wherein the workflow can be suspended for data exchange with a host application, for example. Moreover, such suspension points 212-215 can pertain to switching users of the workflow. For example, the workflow can drive the User Interface (UI) based on the state of the workflow during suspension, such as information relating to the user of the workflow.

The workflow 200 can be defined in the form of a schedule for execution in a computer system. A schedule can include a set of actions having a specified concurrency, dependency, and transaction attributes associated therewith. Each schedule has an associated schedule state, which includes a definition of the schedule, the current location within the schedule, as well as active or live data and objects associated with the schedule. Within a schedule, transaction boundaries can exist based on groupings of actions. In this regard, a transaction can encompass individual actions, or transactions, or groups thereof. Actions can be grouped into sequences, which are executed in serial fashion, as well as tasks in which the actions are executed concurrently, for example. Based on the groupings, therefore, concurrency attributes can be resolved for the actions and transactions within a schedule.

Actions correspond to the work that is done within a schedule and are the basic unit of composition therein. Such actions can include attributes relating to latency, concurrency, and compensation, either alternatively or in combination, within the context of a schedule. For example, an action can send externally originating stimuli to a schedule, thereby allowing external programs to advance the schedule state. These stimuli can be an event, a message, or a call on a guarded component. In the case of an event, the running schedule acts as a subscriber. Specific instances of the schedule will can to an action such as an event, message, or call on guarded component.

Moreover, actions can drive method calls on components. Such actions typically instantiate a component, (e.g., create an instance of the component), call a method on the instance, and subsequently release the reference to the instance if it is not used later in the schedule. When an application executes a schedule, an instance of a scheduler engine can be created and the schedule and an associated binding are loaded.

Actions, moreover, can include information regarding the expected or actual completion time or latency. Such information can be embedded in the schedule definition when the schedule is being defined, and/or may be provided dynamically at runtime based on historical or predictive information about the latency of the action.

The suspension points 212-215 can also indicate dehydration points in the workflow. Because a workflow might run for hours, days, or weeks, the runtime 200 can automatically shut down a running workflow, and persistently store its state at suspension points 212-215 when it has been inactive for a period of time. Dehydration generally refers to a method of selectively storing a schedule state in a storage medium based on latency considerations. For example, when an action in a schedule is expected to wait five hours for an incoming message, the schedule state may be dehydrated to disk until the message is received. In such a situation, the system may perform other tasks until the message is received, thereby significantly improving the work output and efficiency of the system. Accordingly, user input and associated interaction can be supplied to the workflow during various interactivity breaks that request user input, to enable a controlled/synchronous data exchange between the workflow and a host application that is associated with the workflow. Thus, at defined times within an execution of the workflow, user context can be associated with a workflow instance.

The following provides an exemplary definition for the interactive activity component, to suspend and/or resume a workflow instance at suspension points 212-215:

```
[Executor(typeof(InteractiveActivityExecutor))]
public class InteractiveActivity : EventSinkActivity
{
    public string InteractionIdentifier {get; set;}
    public string Action {get; set;}
    protected override void
Initialize(IServiceProvider context)
    {
        IInteractivityControl hostInterface =
context.GetService(typeof(IInteractivityControl)) as
            IInteractivityControl;
        if (hostInterface == null)
        {
            throw new
System.InvalidOperationException ( );
        }
        hostInterface.Resume += new
            System.EventHandler<AspInteractivity.
                WorkflowResumeArgs>(this.OnResume);
    }
    private void OnResume(object sender,
        AspInteractivity.WorkflowResumeArgs e)
    {
        this.Action = e.Action;
    }
    ...
}
public class InteractiveActivityExecutor :
            ActivityExecutor<InteractiveActivity>
{
    protected override Status
Execute(InteractiveActivity activity,
            ActivityExecutionContext context)
    {
        IInteractivityControl hostInterface =
context.GetService(typeof(IInteractivityControl)) as
            IInteractivityControl;
        if (hostInterface == null)
        {
            throw new
System.InvalidOperationException( );
        }
```

-continued

```
        SuspensionInfo info =
            new SuspensionInfo(((InteractiveActivity)
                activity).InteractionIdentifier,
        null,
WorkflowSuspendType.InteractiveActivityBreak);
            hostInterface.Suspend(info);
            Status status = base.Execute(activity,
context);
            return status;
        }
    }
```

As indicated, the activity class can employ its own executor for the purpose of blocking the workflow's execution by calling the Suspend method on the Interactivity Service. Such can initiate the propagation of the InteractionIdentifier associated with the Interactive Activity component up to the host's handler.

Accordingly, an interactive workflow can be provided that executes up to particular points, and provides feedback to the host application. The host application can change an appearance of the workflow based on the suspension state. A workflow type can be defined (e.g., programmatically or via a visual tool), and the host application subscribes to suspending events to supply a hook into the execution of the workflow. The suspending event(s) can then be raised and based on the information in such event (e.g., information regarding a current user of the workflow), the UI appearance can change. Thus, data can be passed in and out of a workflow class, and custom features can be defined for interaction during run time (e.g., strongly typed workflow).

FIGS. 3 & 4 illustrate particular flow charts for an expense report with suspension points, which enables user input and associated interaction during various interactivity breaks that request user input, to enable a controlled and/or synchronous data exchange between the workflow and a host application that is associated with the workflow. The flowcharts 300 & 400 illustrate employing SwitchUser activity and the InteractiveActivity component as suspension points within a generic Expense Reporting workflow.

As such and in the context of an expense report, an initial user can initiate an expense report workflow, and an approver user can then approve such expense report. Thus, a process can be abstracted into the workflow class, wherein the process and workflow class is being run up to a point where an approver should be involved. At such point the interaction of the initial user is stopped. The approver can then launch the application (e.g., from a different machine) to run the workflow and resume the workflow instance with the action specified by the approver (e.g., approve, disapprove, and the like). Thus, data can be passed in and out of the workflow instance at suspension points during lifetime of the workflow instance.

Figure 5:
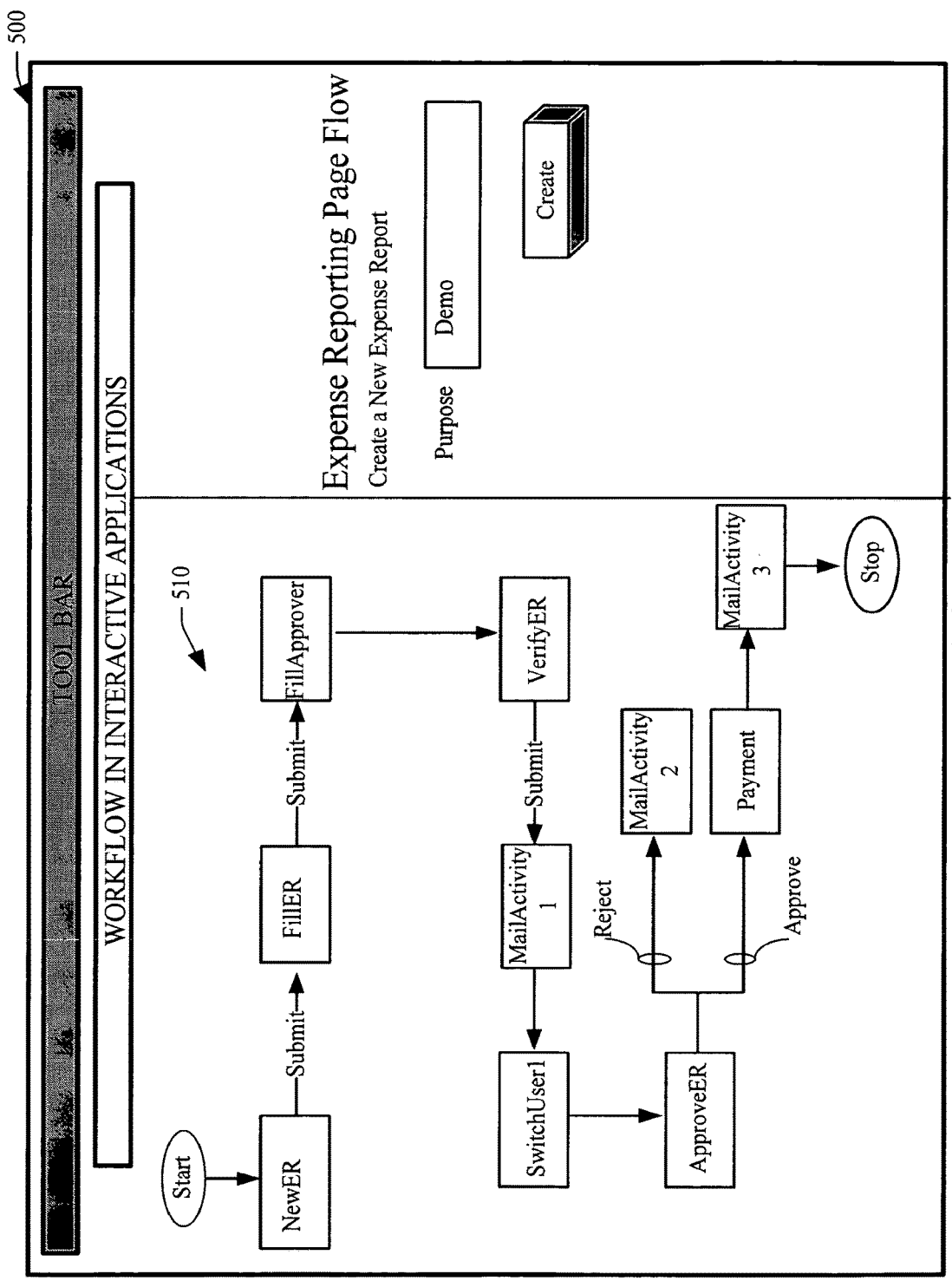
FIG. 5 illustrates an exemplary graphical interface employed for presentation of various acts executed during workflow execution.

As shown in FIG. 3, the box 310 represents a SubmittedER act, wherein a suspension state is indicated for the host application to render a submitted expense report view through a graphical interface (e.g., a dedicated form), as described in detail infra in FIG. 5. Moreover, the act 320 in the workflow definition 300 represents an instance of the SwitchUser activity through which the subject innovation changes the current association between the user responsible for the execution of the next workflow segment and the workflow instance. Such typically ensures that the workflow can be resumed by an approve/reject action performed under the execution context of the appropriate user only. Likewise acts 330, 430 represent instances of the InteractiveActivity break, in accordance with an exemplary aspect of the subject innovation. Similarly, box 420 that is designated as the NewER illustrates a New Expense Report, wherein the workflow becomes suspended while waiting for global expense reporting data to be provided as the result of user input through a graphical interface (e.g., a dedicated form of FIG. 5.)

The workflow features application for submitting and approving expense reports, wherein the application contains multiple pages that are orchestrated by a workflow. In addition to various activities and control flow constructs, the workflow demonstrates how the associated user can be switched, when presented to an approver of the expense report, for example. As explained earlier, during the FillER act 430, the workflow is suspended and a user can continue to add line items to the expense report. Querying the list of available in-progress workflows to display in the application workflow can also be included.

For example, the Expense reporting application can contain a home page that lists expense reports in progress that have been submitted by the current user, and any expense reports awaiting the user's approval. Such application enables creating new expense reports by: specifying information such as expense report purpose and the like; adding the individual line items; and verifying the accuracy of the information. Moreover, the application can send email notification 460 to the approver when a new expense report is submitted. The approver can subsequently view an expense report and either approve it or reject it, upon which a final mail is sent.

The following provides for an exemplary Expense Reporting workflow definition that incorporates interactivity in accordance with an exemplary aspect of the subject innovation.

```
<Workflow Name="ExpenseReportingWorkflow"
    Inherits="InteractiveWorkflow"
    Implements="ITrackingWorkflowStateHandler"
    xmlns="System.ApplicationServices.Workflows,System.ApplicationServices.Workflow"
    xmlns:w="System.Web.Workflows,System.Web"
    xmlns:s="SampleApp">
    <StartActivity Name="Start">
        <Transitions>
            <ActivityTransition Destination="NewER" />
        </Transitions>
    </StartActivity>
    <UIActivity Name="NewER"
    InteractionIdentifier="NewER" Actions="Submit">
        <Transitions>
            <ActivityTransition Destination="FillER" Action="Submit" />
        </Transitions>
    </UIActivity>
    <UIActivity Name="FillER"
    InteractionIdentifier="FillER" Actions="AddItem, Submit">
        <Transitions>
            <ActivityTransition Destination="FillER" Action="AddItem" />
            <ActivityTransition Destination="FillApprover" Action="Submit" />
        </Transitions>
    </UIActivity>
    <CodeActivity Name="FillApprover"
    CustomExecute="FillApprover_CustomExecute">
        <Transitions>
            <ActivityTransition Destination="VerifyER" />
        </Transitions>
    </CodeActivity>
    <UIActivity Name="VerifyER"
    InteractionIdentifier="VerifyER" Actions="Submit">
        <Transitions>
            <ActivityTransition Destination="MailActivity1" Action="Submit" />
        </Transitions>
    </UIActivity>
    <s:MailActivity Name="MailActivity1"
        From="expenses@example.com" Subject="New expense report submitted; approval required.">
        <Transitions>
            <ActivityTransition Destination="SwitchUser1" />
        </Transitions>
    </s:MailActivity>
    <SwitchUserActivity Name="SwitchUser1">
        <Transitions>
            <ActivityTransition Destination="ApproveER" />
        </Transitions>
        <Bindings>
            <ActivityBinding ActivityPropertyName="UserName" WorkflowPropertyName="Approver">
        </Bindings>
    </CodeActivity>
    <UIActivity Name="ApproveER"
    InteractionIdentifier="ApproveER" Actions="Approve, Reject">
        <Transitions>
            <ActivityTransition Destination="Payment" Action="Approve" />
            <ActivityTransition Destination="MailActivity2" Action="Reject" />
        </Transitions>
    </UIActivity>
    <s:MailActivity Name="MailActivity2"
        From="expenses@example.com" Subject="Expense report was rejected.">
        <Transitions>
            <ActivityTransition Destination="Stop" />
        </Transitions>
    </s:MailActivity>
    <CodeActivity Name="Payment"
    CustomExecute="Payment_CustomExecute">
        <Transitions>
            <ActivityTransition Destination="MailActivity3" />
        </Transitions>
    </CodeActivity>
    <s:MailActivity Name="MailActivity3"
        From="expenses@example.com" Subject="Expense report was approved.">
        <Transitions>
            <ActivityTransition Destination="Stop" />
        </Transitions>
    </s:MailActivity>
    <StopActivity Name="Stop" />
    <Code Language="C#">
    private Guid _expenseReportID;
    private ExpenseReport _expenseReport;
    public ExpenseReport ExpenseReport {
        get { return _expenseReport; }
    }
    public Guid ExpenseReportID {
        get { return _expenseReportID; }
        set { _expenseReportID = value; }
    }
    protected override void OnStarting(EventArgs e) {
        base.OnStarting(e);
        _expenseReport = new ExpenseReport( );
        _expenseReportID = _expenseReport.ID;
    }
    private void FillApprover_CustomExecute(object sender, ActivityExecuteEventArgs e) {
        // TODO: Use current user and expense report amount to determine approver
        e.Result = true;
    }
    private void Payment_CustomExecute(object sender, ActivityExecuteEventArgs e) {
        // TODO: Make payment by calling a Web service
```

```
        e.Result = true;
    }
    region Implementation of
ITrackingWorkflowStateHandler
    void ITrackingWorkflowStateHandler.BeginLoad( ) {
    }
    void ITrackingWorkflowStateHandler.BeginSave( ) {
ExpensesDB.UpdateExpenseReport(_expenseReport);
    }
    void ITrackingWorkflowStateHandler.EndLoad( ) {
        _expenseReport =
ExpensesDB.GetExpenseReport(ExpenseReportID);
    }
    void ITrackingWorkflowStateHandler.EndSave( ) {
    }
    #endregion
    </Code>
</Workflow>
Web.config
<system.web>
    <pageFlows>
        <pageFlow name="ExpenseReporting"
            workflow="ExpenseReporting.workflow"
            provider="SqlWorkflowProvider"
            startPagePath="Default.aspx">
            <pages>
                <add name="NewER" pagePath="NewER.aspx"
behavior="CreateWorkflow" />
                <add name="FillER" pagePath="FillER.aspx"
behavior="ResumeWorkflow" />
                ...
            </pages>
        </pageFlow>
    </pageFlows>
</system.web>
Default.aspx
<%@ Page %>
<html>
<body>
<form runat="server">
    <asp:WorkflowDataSource runat="server"
id="pendingWorkflows"
        pageFlowName="ExpenseReporting"
Filter="CreatedByUser" />
    <asp:WorkflowDataSource runat="server"
id="approvalWorkflows"
        pageFlowName="ExpenseReporting"
Filter="AssignedToUser" />
    Expense Reports Pending Approval:
    <asp:GridView runat="server"
DataSourceID="pendingWorkflows" />
    Expense Reports Needing Approval:
    <asp:GridView runat="server"
DataSourceID="approvalWorkflows" />
    <a href="NewER.aspx">Create New Expense Report</a>
</form>
</body>
</html>
Approve.aspx
<%@ Page %>
<asp:PageFlowManager runat="server"
id="pageFlowManager1"
PageFlowName="ExpenseReporting" />
<html>
<body>
<form runat="server">
    <asp:FormView runat="server"
DataSourceID="pageFlowManager1">
        <ItemTemplate>
            ...
        </ItemTemplate>
    </asp:FormView>
    <asp:ActionButton runat="server" Text="Approve">
        <ClickActions>
            <asp:PageFlowAction Type="Resume"
ResumeAction="Approve" />
        </ClickActions>
    </asp:ActionButton>
    <asp:ActionButton runat="server" Text="Reject">
        <ClickActions>
            <asp:PageFlowAction Type="Resume"
ResumeAction="Reject" />
        </ClickActions>
    </asp:ActionButton>
</form>
</body>
</html>
```

FIG. 5 illustrates an exemplary graphical interface (e.g., a dedicated form) that can be employed in conjunction with various aspects of the subject innovation. Such an expense reporting application for a page flow 510 features a web application for submitting and approving expense reports, for example. The application contains multiple pages that are orchestrated by a workflow. In addition to various activities and control flow constructs, the workflow demonstrates how the associated user can be switched. The page flow 510 also demonstrates querying the list of available in-progress workflows to display in the application workflow. For example, the workflow can drive the User Interface (UI) based on the state of the workflow during suspension, such as information relating to the user of the workflow. Accordingly, an interactive workflow is supplied, which executes up to particular points, and provides feed back to the hosting application. Moreover, the hosting application can change an appearance of the workflow based on the suspension state. As explained above in the context an expense report, a workflow type can be defined (e.g., programmatically or via a visual tool), and the host application subscribes to suspending events to supply a hook into the execution of the workflow. The suspending event(s) can then be raised and based on the information in such event (e.g., information regarding a current user of the workflow), the UI appearance can change. Thus, data can be passed in and out of a workflow class, and custom features can be defined for interaction during run time (e.g., strongly typed workflow). Also, the host can query the workflow instance to identify the current interaction activity that caused the workflow to become suspended and/or idle.

Figure 6:
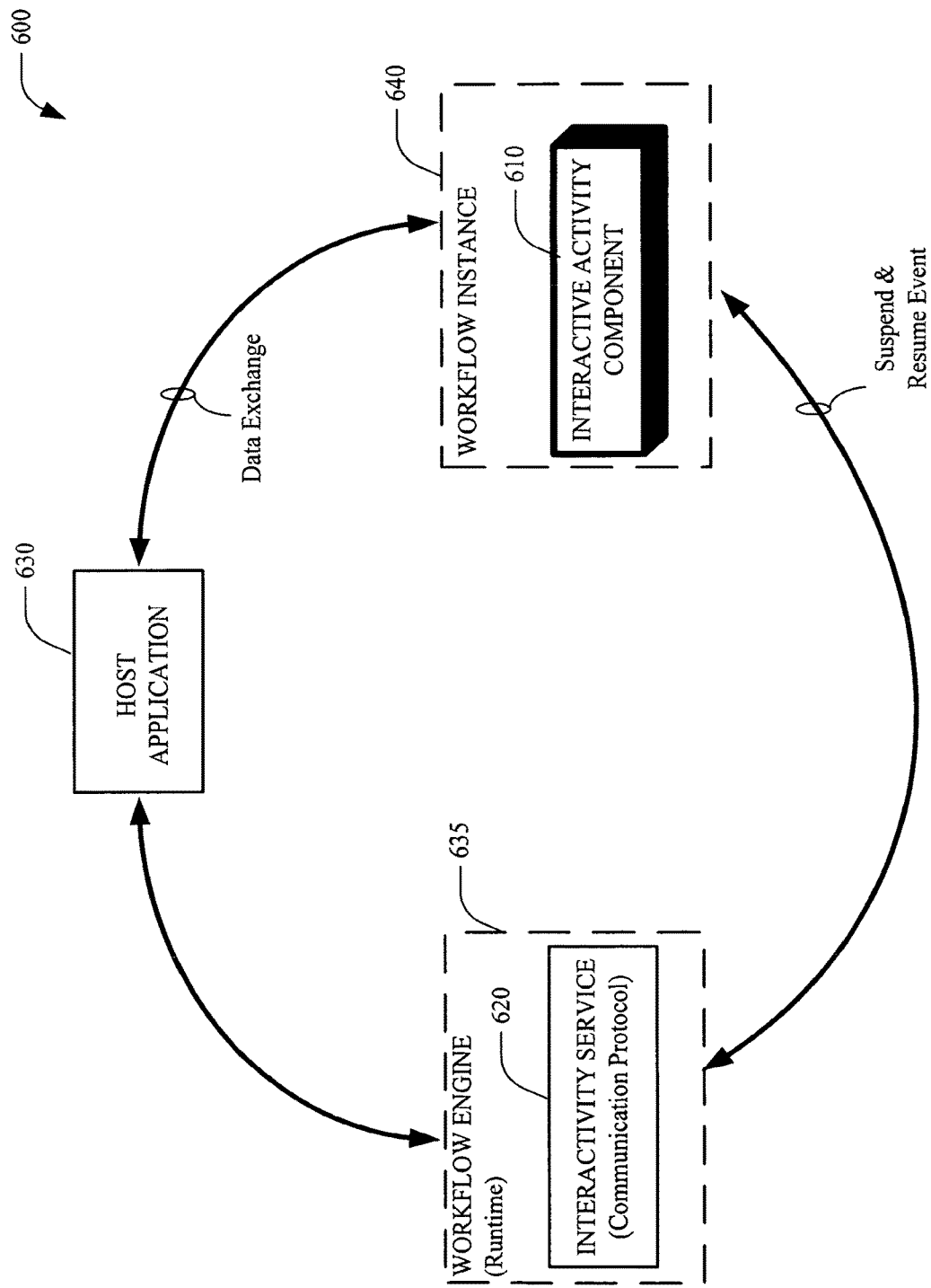
FIG. 6 illustrates a data exchange between a workflow instance and the host application in accordance with an aspect of the subject innovation.

FIG. 6 illustrates a block diagram for a system 600 that can model suspension points within a workflow definition, wherein data is being passed in and out of the workflow to form an interactive workflow. Typically a suspend event can be raised, in a workflow instance 640 that has an interactive activity component 610 enacted as part thereof, to enable a suspension in the execution of the workflow, either in terms of time, or by switching the current user, for example. The workflow can start execution by executing the contained StartActivity, and end when the StopActivity is executed. During the course of executing, each activity can be checked to verify if it can be executed. If the activity cannot execute the workflow is suspended, for example. If an activity can be executed, an associated Execute method is invoked, and if the method returns a success result, the appropriate activity transition is used to determine the next activity. Workflows can be suspended for a number of reasons, such as: canceling of an activity execution, inability for an activity to continue execution, a specific delay introduced to postpone subsequent execution, and switching of user context requiring subsequent execution to be carried out by a different user. Once suspended, the workflow instance can be saved/serialized into a database or equivalent storage, from which it can be subsequently retrieved, deserialized, and resumed. A workflow can also enter an error state, if an activity execution results in an error that is not handled.

As illustrated in FIG. 6, the interactive activity component 610 can raise the event thru the interactivity service 620, which is associated with the workflow engine/run-time 635. Subsequently, the workflow is suspended and the host 630 can exchange data (e.g., obtain data) with the workflow instance 640. The host can then resume the workflow, via calling the interactive activity service 620, to resume the workflow execution. Accordingly, user input and associated interaction can be supplied to the workflow during various interactivity breaks that request user input, to enable a controlled/synchronous data exchange between the workflow and a host application that is associated with the workflow.

Figure 7:
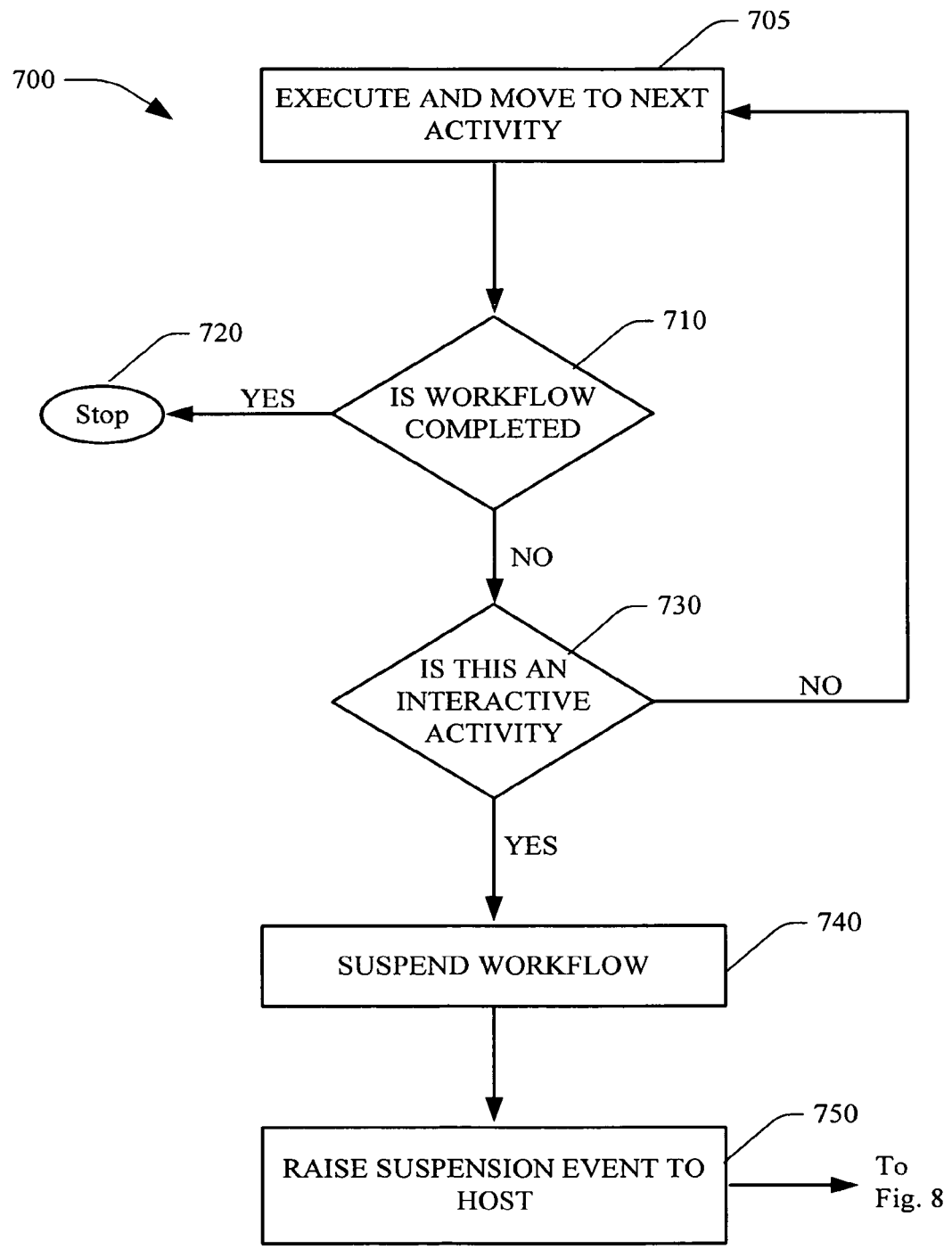
FIGS. 7-9 illustrate an exemplary methodology of workflow execution flow in accordance with an aspect of the subject innovation.
Figure 8:
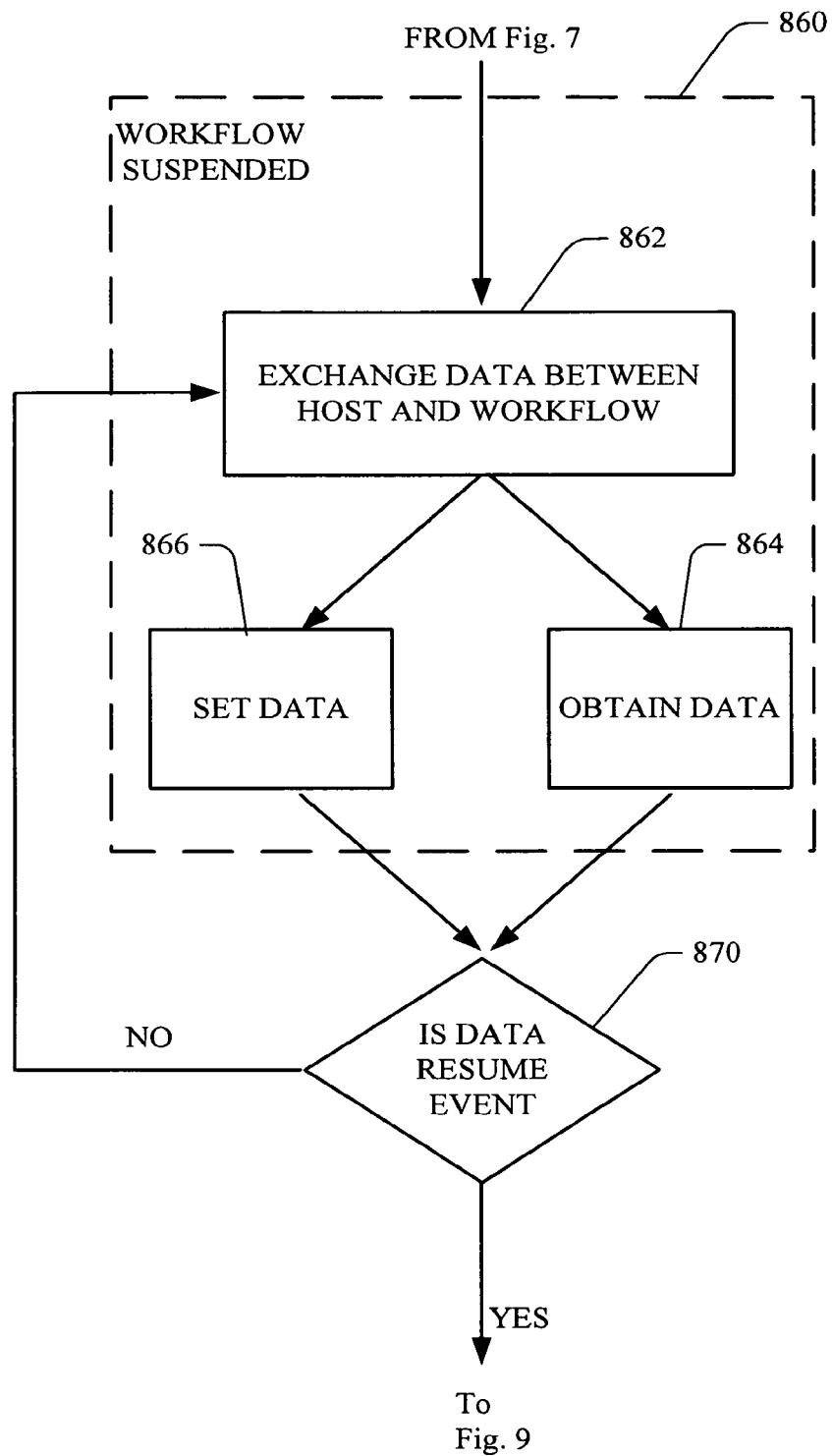
Figure 9:
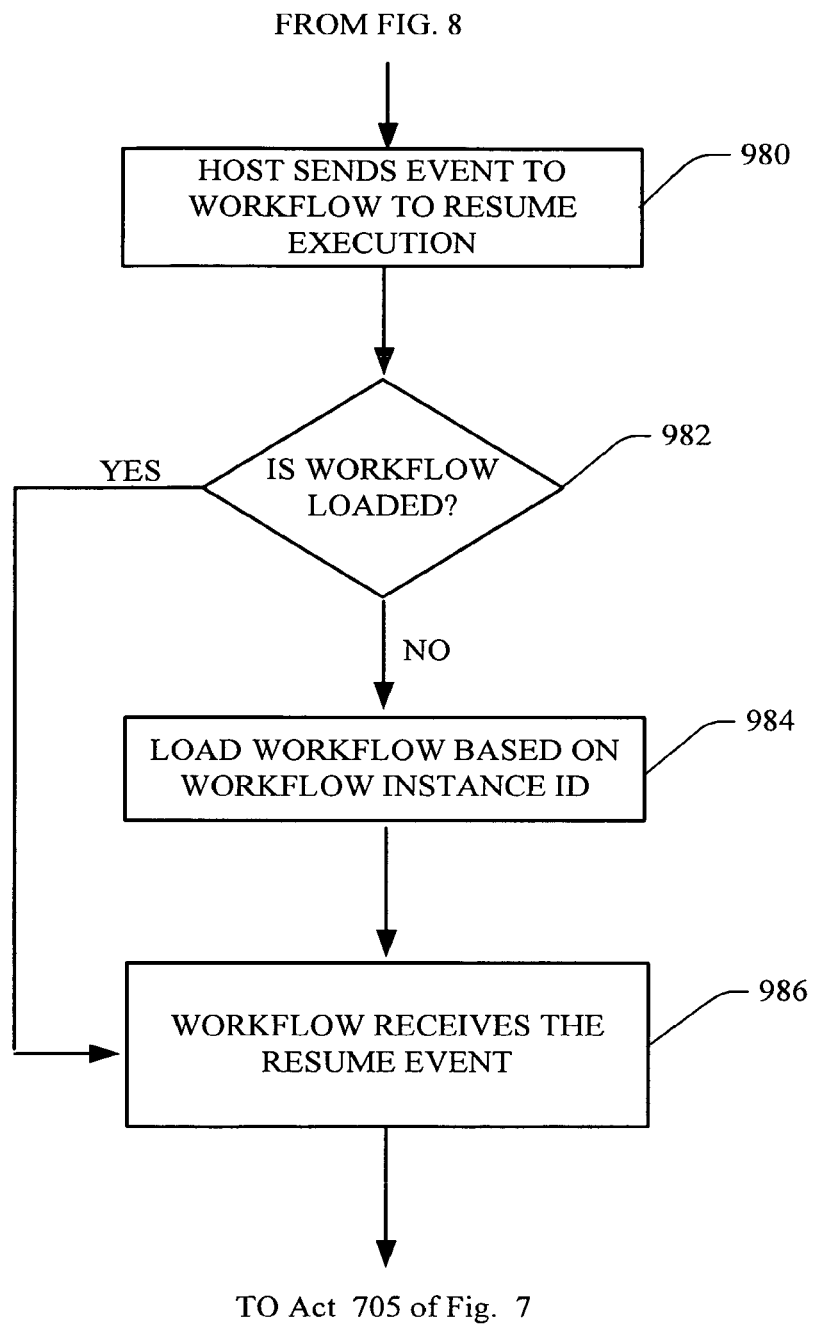

FIGS. 7-9 illustrate exemplary flow charts of workflow execution flow in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. As illustrated in FIG. 7, the methodology 700, the workflow process 705 executes and moves to the next act in the process. The workflow execution can verify at 710 whether the act to be executed signifies an end of the workflow. If so the execution of the workflow ends at 720. Otherwise, the methodology proceeds to act 730 wherein the act to be executed by the workflow is checked to verify whether it is an interactive activity. If so, the workflow is suspended at 740, to enable interaction with a host application as described in detail supra. Otherwise, the methodology returns to act 705, wherein the workflow executes the current act and proceeds to the next one.

As illustrated in FIG. 7 and subsequent to the suspension of the workflow at 740, the execution flow proceeds to raise a suspension event to the host, at 750. As such, and as illustrated in FIG. 8 while the workflow instance is suspended at 860, data is exchanged between the host and the workflow at 862. As such, data can be passed into and/or out of the workflow. Such can include obtaining data from the workflow instance at 864 and/or setting data by the host at 866. Accordingly, user input and associated interaction can be supplied to the workflow during various interactivity breaks that request user input, to enable a controlled/synchronous data exchange between the workflow and a host application that is associated with the workflow. Thus, at defined times within an execution of the workflow, user context can be associated with a workflow instance.

At 870, verification can be performed to check if the data fired by the host is a resume event. If not, then the workflow instance can remain in a suspended state to continue the data exchange, and the methodology returns to act 862. Otherwise, the methodology proceeds to FIG. 9, wherein the host can send an event to the workflow to resume execution at 980. A verification can performed at 982 regarding whether the workflow is loaded. If so, the workflow receives the resume event at 986 and subsequently returns to act 705 to execute a next act of the execution flow. Otherwise, and if the workflow is not loaded, then the workflow is loaded based on an identification associated therewith (e.g., when workflow instance was created) at 984, and then proceeds to act 986 for resuming the workflow.

Figure 10:
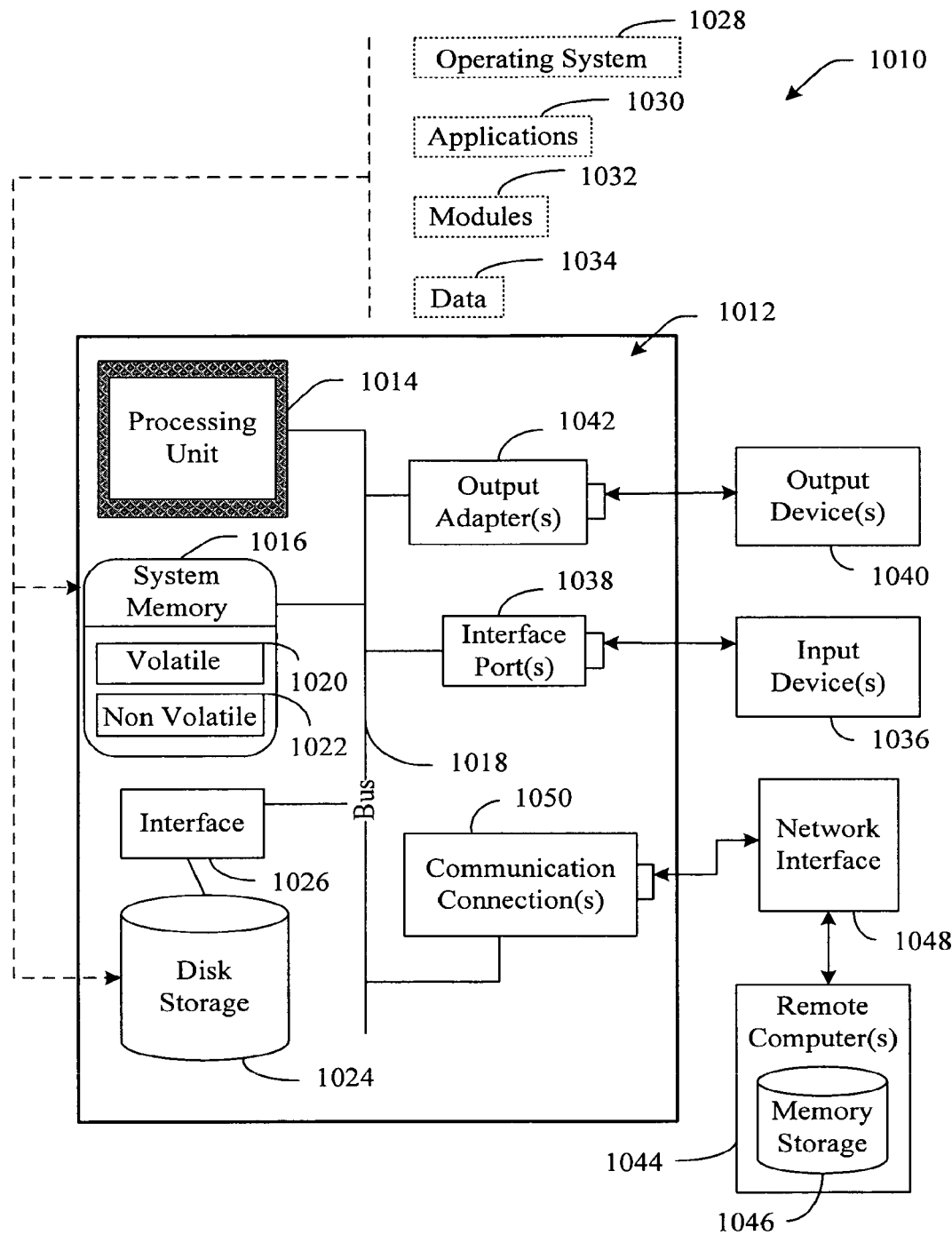
FIG. 10 illustrates an exemplary environment for implementing various aspects of the subject innovation.
Figure 11:
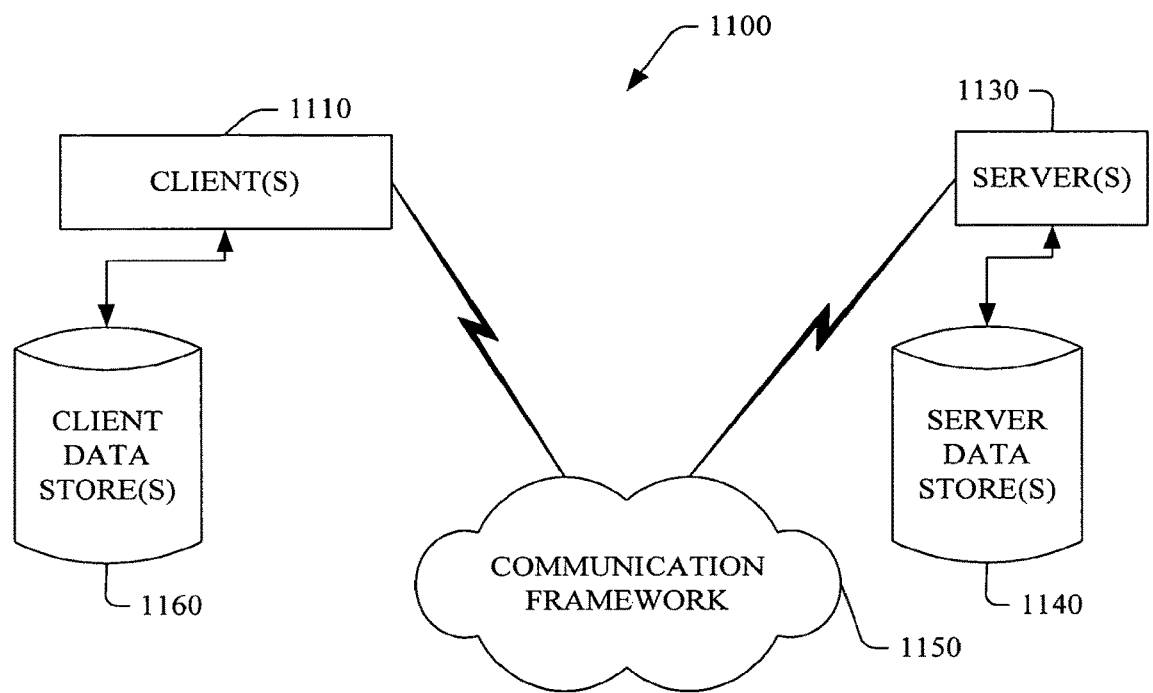
FIG. 11 is a schematic block diagram of an additional-computing environment that can be employed to implement a workflow with an interactive activity component of the subject innovation.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, etc. that perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed to implement a workflow with an interactivity component of the subject innovation. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system, comprising:
a processor; and
a memory comprising a workflow system and an interactive activity component, wherein:
the workflow system includes a workflow runtime, the workflow runtime being configured to execute a workflow that includes a plurality of workflow activities;

the workflow system is configured to receive data through the interactive activity component;

the interactive activity component is configured to receive user input and incorporate the user input into the workflow;

the workflow system is configured to suspend execution of the workflow when a suspension point associated with the interactive activity component is reached;

the workflow system is configured to supply the user input collected at the suspension point to the workflow; and the workflow system is configured to resume execution of the workflow subsequent to receiving the user input.

2. The computer implemented system of claim 1, wherein the workflow system is also configured to send data to the interactive activity component.

3. The computer implemented system of claim 1, wherein the workflow system is configured to communicate state of the workflow to a component defining a user interface, the state being configured to affect an appearance of the user interface.

4. The computer implemented system of claim 1, wherein the interactive activity component is configured to receive the user input while the workflow is suspended.

5. The computer implemented system of claim 1, wherein the workflow is configured to enter an error state based on lapse of a period of time.

6. The computer implemented system of claim 1, wherein the workflow is configured for interaction with a plurality of different users.

7. The computer implemented system of claim 1, wherein the plurality of workflow activities include a starting activity, an interactive activity, and an ending activity.

8. A method, implemented at a computer system that includes a processor and a memory comprising a workflow system and an interactive activity component, the workflow system being configured to receive data through the interactive activity component, the method comprising:

executing a workflow by a workflow runtime of the workflow system, the workflow including a plurality of workflow activities;

receiving user input by the interactive activity component and incorporating the user input into the workflow;

suspending execution of the workflow when a suspension point associated with the interactive activity component is reached;

supplying the user input collected at the suspension point to the workflow; and resuming execution of the workflow subsequent to receiving the user input.

9. The method of claim 8, wherein the workflow system is also configured to send data to the interactive activity component.

10. The method of claim 8, wherein the workflow system communicates state of the workflow to a component defining a user interface, the state being configured to affect an appearance of the user interface.

11. The method of claim 8, wherein the interactive activity component receives the user input while the workflow is suspended.

12. The method of claim 8, wherein the workflow enters an error state based on lapse of a period of time.

13. The method of claim 8, wherein the workflow is configured for interaction with a plurality of different users.

14. The method of claim 8, wherein the plurality of workflow activities include a starting activity, an interactive activity, and an ending activity.

15. A computer program product comprising one or more hardware storage devices having stored thereon computer-executable instructions that are configured such that, when executed by one or more processors of a computer system, the computer executable instructions cause the computer system to instantiate a workflow system and an interactive activity component, and wherein:

the workflow system includes a workflow runtime, the workflow runtime being configured to execute a workflow that includes a plurality of workflow activities;

the workflow system is configured to receive data through the interactive activity component;

the interactive activity component is configured to receive user input and incorporate the user input into the workflow;

the workflow system is configured to suspend execution of the workflow when a suspension point associated with the interactive activity component is reached;

the workflow system is configured to supply the user input collected at the suspension point to the workflow; and the workflow system is configured to resume execution of the workflow subsequent to receiving the user input.

16. The computer program product of claim 15, wherein the workflow system is also configured to send data to the interactive activity component.

17. The computer program product of claim 15, wherein the workflow system is configured to communicate state of the workflow to a component defining a user interface, the state being configured to affect an appearance of the user interface.

18. The computer program product of claim 15, wherein the interactive activity component is configured to receive the user input while the workflow is suspended.

19. The computer program product of claim 15, wherein the workflow is configured to enter an error state if an error occurs when collecting the user input.

20. The computer program product of claim 15, wherein the plurality of workflow activities include a starting activity, an interactive activity, and an ending activity.

* * * * *